United States Patent
Takahashi et al.

(10) Patent No.: US 12,382,968 B2
(45) Date of Patent: Aug. 12, 2025

(54) POULTRY PROCESSING APPARATUS

(71) Applicant: MAYEKAWA MFG. CO., LTD., Tokyo (JP)

(72) Inventors: Noriyuki Takahashi, Tokyo (JP); Koji Takanashi, Tokyo (JP); Sayaka Iwaki, Tokyo (JP)

(73) Assignee: MAYEKAWA MFG. CO., LTD., Tokyo (JP)

( * ) Notice: Subject to any disclaimer, the term of this patent is extended or adjusted under 35 U.S.C. 154(b) by 0 days.

(21) Appl. No.: 18/716,270

(22) PCT Filed: Jul. 20, 2023

(86) PCT No.: PCT/JP2023/026498
§ 371 (c)(1),
(2) Date: Jun. 4, 2024

(87) PCT Pub. No.: WO2024/029343
PCT Pub. Date: Feb. 8, 2024

(65) Prior Publication Data
US 2025/0031707 A1 Jan. 30, 2025

(30) Foreign Application Priority Data
Aug. 3, 2022 (JP) ................................. 2022-124047

(51) Int. Cl.
*A22C 21/00* (2006.01)
(52) U.S. Cl.
CPC ...... *A22C 21/0069* (2013.01); *A22C 21/0053* (2013.01)

(58) Field of Classification Search
CPC ............ A22C 21/0069; A22C 21/0053; A22C 21/0023; A22C 21/00
(Continued)

(56) References Cited

U.S. PATENT DOCUMENTS 5,098,337 A * 3/1992 Landt ................. A22C 21/0069
452/136
5,984,770 A 11/1999 Asano et al.
(Continued)

FOREIGN PATENT DOCUMENTS

JP H1033110 A 2/1998
JP 2011125317 A 6/2011
(Continued)

OTHER PUBLICATIONS

International Preliminary Report on Patentability issued in Intl. Appln. No. PCT/JP2023/026498, mailed Feb. 13, 2025. English translation provided.
(Continued)

*Primary Examiner* — Richard T Price, Jr.
(74) *Attorney, Agent, or Firm* — ROSSI, KIMMS & McDOWELL LLP (57) ABSTRACT

A poultry processing apparatus according to an embodiment includes: a scraper part for separating a meat part around scapula bones of a poultry carcass held by a holder from the scapula bones; and an incision blade with a cutting edge for incising a skin between the scapula bones of the meat part that rides up on the scraper part. The cutting edge extends in a direction away from the holder as the cutting edge extends upstream in a traveling direction in which the scraper part travels toward the holder in separating the meat part from the scapula bones.

11 Claims, 11 Drawing Sheets

(58) Field of Classification Search
USPC .......................................................... 452/136
See application file for complete search history.

(56) References Cited

U.S. PATENT DOCUMENTS

| | | | |
|---|---|---|---|
| 6,007,416 A * | 12/1999 | Janssen ................ | A22C 21/003 |
| | | | 452/136 |
| 6,277,020 B1 * | 8/2001 | Stephens ............ | A22C 21/0023 |
| | | | 452/169 |
| 9,706,782 B2 | 7/2017 | Inoue et al. | |
| 2009/0170417 A1 * | 7/2009 | Janssen .............. | A22C 21/0053 |
| | | | 452/136 |
| 2017/0119002 A1 | 5/2017 | Inoue et al. | |

FOREIGN PATENT DOCUMENTS

| | | | |
|---|---|---|---|
| JP | 6216056 B2 | 10/2017 | |
| WO | 2016002629 A1 | 1/2016 | |

OTHER PUBLICATIONS

English translation of Written Opinion issued in Intl. Appln. No. PCT/JP2023/026498, mailed Aug. 22, 2023, Jun. 4, 2024.
International Search Report issued in Intl. Appln. No. PCT/JP2023/026498, mailed Aug. 22, 2023. English translation provided.
Written Opinion issued in Intl. Appln. No. PCT/JP2023/026498, mailed Aug. 22, 2023.

* cited by examiner

CROSS-SECTION A-A

CROSS-SECTION B-B

POULTRY PROCESSING APPARATUS

TECHNICAL FIELD

The present disclosure relates to a poultry processing apparatus for cutting up poultry carcasses of fowls such as chickens.

BACKGROUND

Generally, in the cut-up processing of cutting up poultry carcasses of fowls such as chickens and separating meat and bone, the carcasses are plucked and bled, and pre-processed by removing guts and other organs (evisceration), followed by cutting and deboning. Since the cutting and deboning process is inefficient when performed manually, automation is being promoted (see, for example, Patent Document 1).

CITATION LIST

Patent Literature

Patent Document 1: JP6216056B

SUMMARY

Problems to be Solved

The scapula incision-making apparatus described in the above-mentioned patent document can separate a meat part around scapula bones of a poultry carcass from the scapula bones. After the meat part around the scapula bones is separated from the scapula bones, the skin between the scapula bones is incised from the outside of the meat part through the process of incising the skin between the scapula bones. In this process, there is a risk of damaging the neck meat part of the poultry carcass. Cutting and removing the damaged portion of the neck meat part may cause the remaining portion of the neck meat part to split wide open and reduce the commercial value of the neck meat part.

In view of the above, an object of at least one embodiment of the present disclosure is to provide a poultry processing apparatus that can improve the yield of neck meat part of poultry carcasses.

Solution to the Problems (1) A poultry processing apparatus according to at least one embodiment of the present disclosure includes: a scraper part for separating a meat part around scapula bones of a poultry carcass held by a holder from the scapula bones; a cutting edge extending in a direction away from the holder as the cutting edge extends upstream in a traveling direction in which the scraper part travels toward the holder in separating the meat part from the scapula bones; and an incision blade with the cutting edge for incising a skin between the scapula bones of the meat part that rides up on the scraper part.

Advantageous Effects

According to at least one embodiment of the present disclosure, it is possible to improve the yield and quality of neck meat part of poultry carcasses.

DETAILED DESCRIPTION

Embodiments of the present disclosure will be described below with reference to the accompanying drawings. It is intended, however, that unless particularly identified, dimensions, materials, shapes, relative positions, and the like of components described in the embodiments shall be interpreted as illustrative only and not intended to limit the scope of the present disclosure.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

Figure 1:
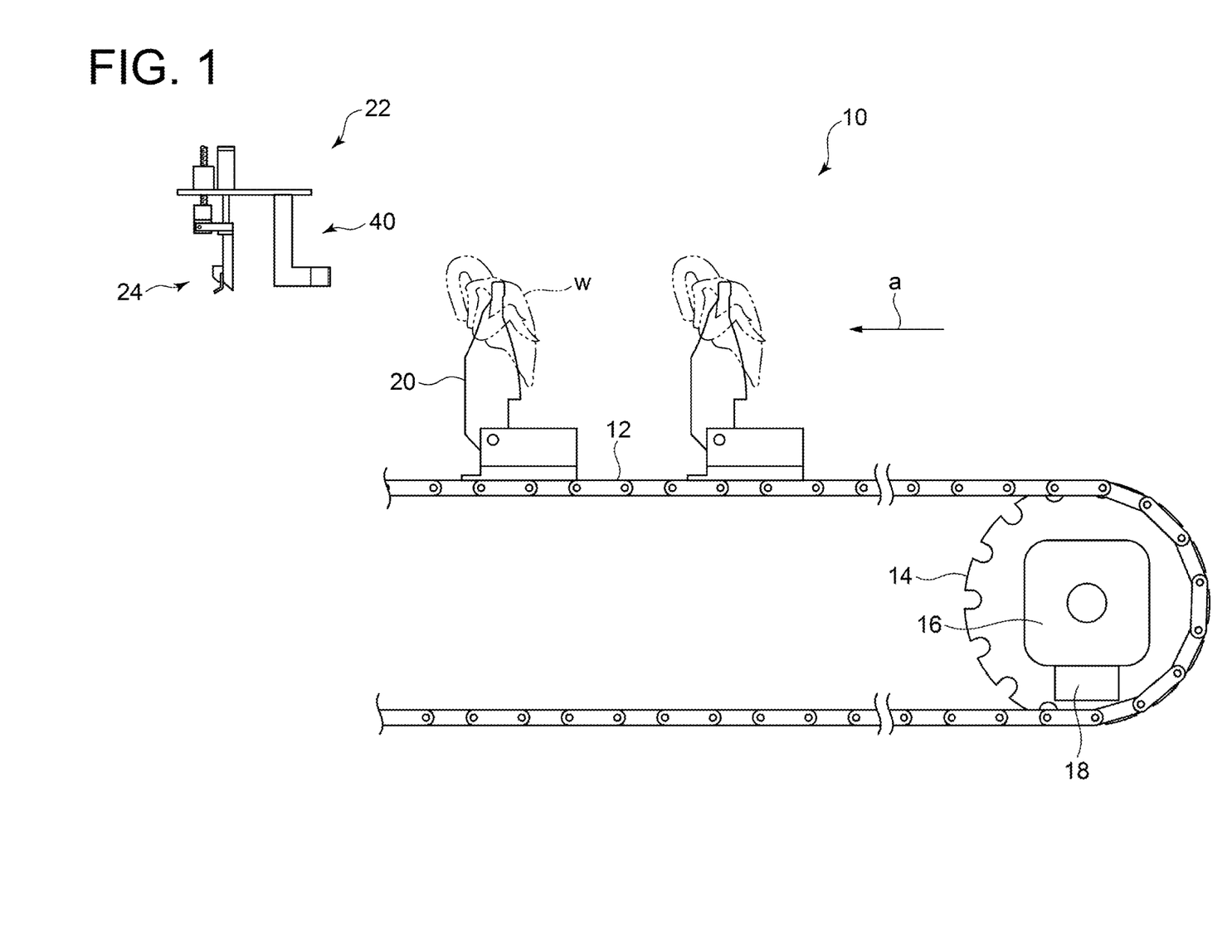
FIG. 1 is an overall schematic diagram of a poultry processing apparatus according to an embodiment.

FIG. 1 is an overall schematic diagram of a poultry processing apparatus according to an embodiment.

Figure 2:
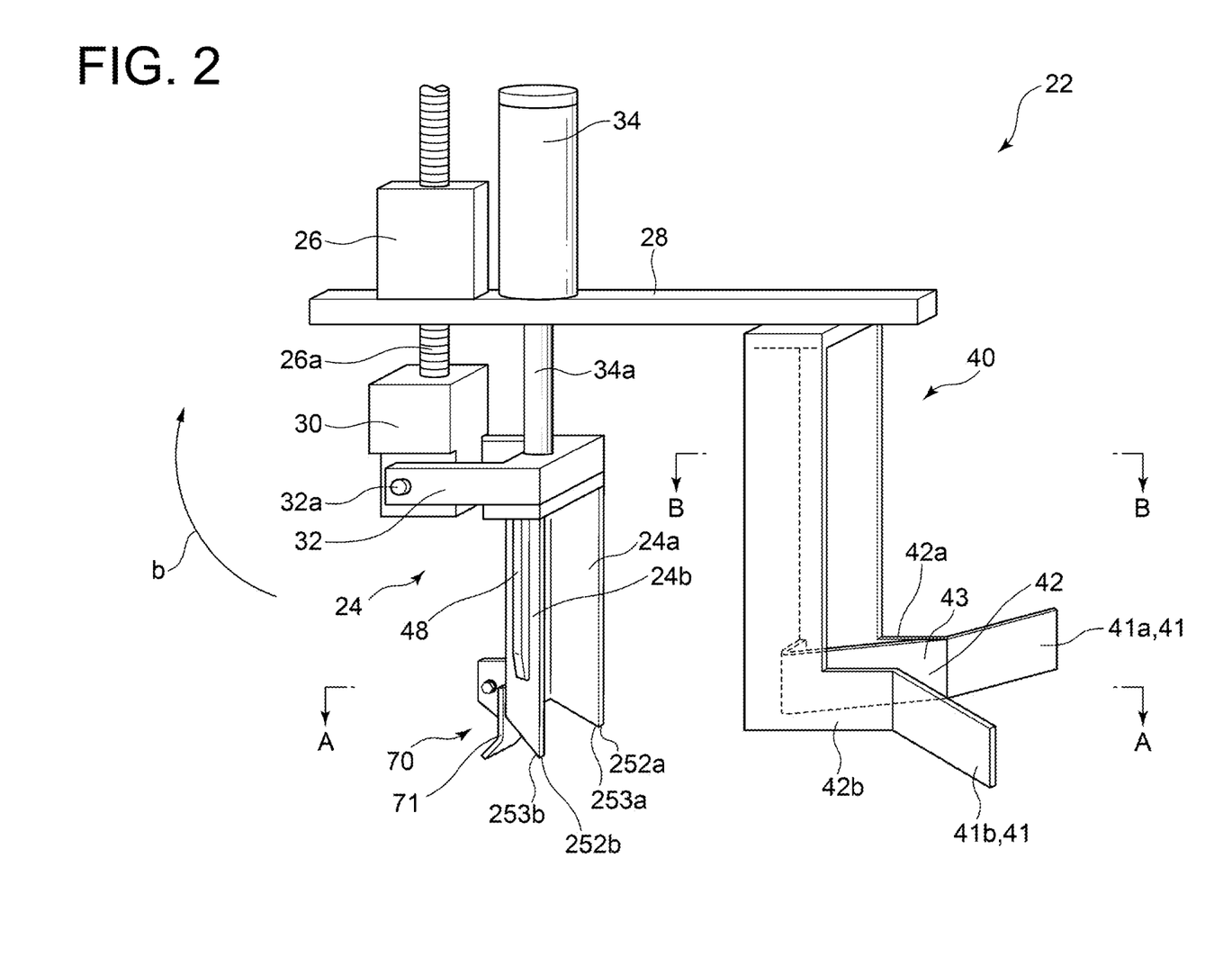
FIG. 2 is a perspective view of an incision making part according to an embodiment.

FIG. 2 is a perspective view of an incision making part according to an embodiment.

Figure 3:
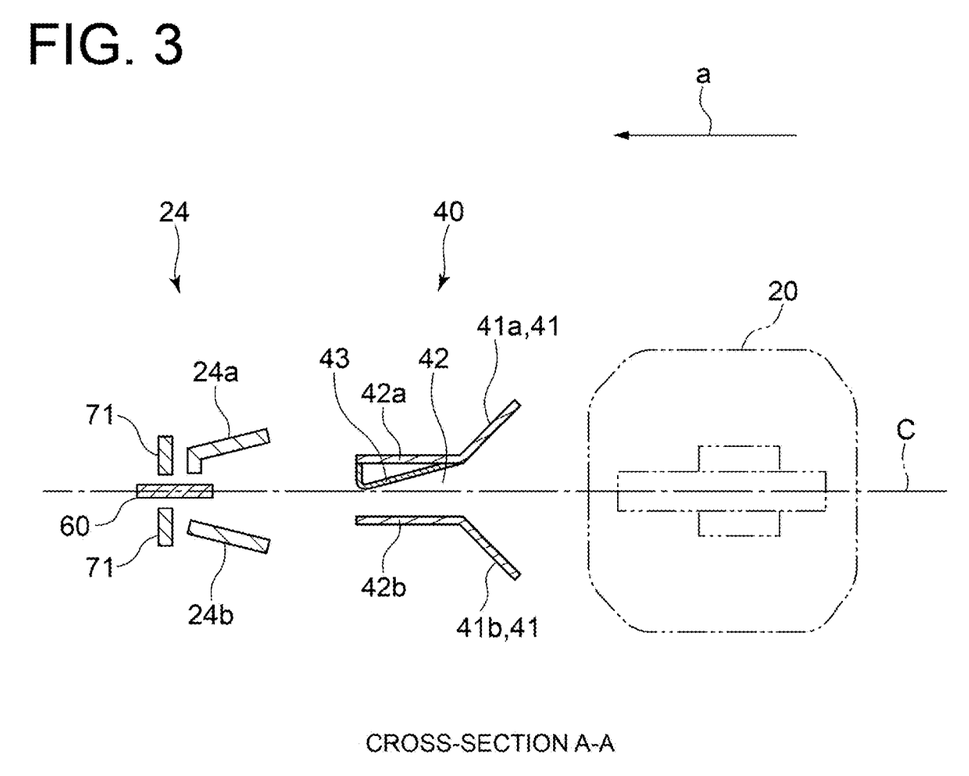
FIG. 3 is a cross-sectional view taken along line A-A in FIG. 2.

FIG. 3 is a cross-sectional view taken along line A-A in FIG. 2.

The poultry processing apparatus 10 is equipped with an endless chain conveyor 12 arranged in the horizontal direction. The chain conveyor 12 is wound around a driving sprocket 14 at the beginning. The driving sprocket 14 is driven by a motor 16. In the figures, the chain conveyor 12 moves in the direction of arrow a during the outward journey. The endless chain conveyor 12 is wound around a driven sprocket (not shown) at the end.

The chain conveyor 12 is equipped with a plurality of fixing jigs 20 called "cones" at equal intervals. In the illustrated embodiment, the upper half of the fixing jig 20 has a conical shape and stands perpendicular to the chain conveyor 12, but it is tiltable as needed during the conveyance.

The chain conveyor 12 forms a conveyance path for the fixing jig 20, and the fixing jig 20 is conveyed along the conveyance path.

A poultry carcass (hereinafter, referred to as "workpiece") w of a fowl such as a chicken, with legs separated and eviscerated to leave only the upper half in pre-processing, is placed and fixed on each fixing jig 20 by a worker at the beginning of the chain conveyor 12. The workpiece w is placed and held on the fixing jig 20 with a breast part facing upstream or downstream in the conveying direction (in the illustrated embodiment, downstream in the conveying direction). The fixing jig 20 is also referred to as a holder.

In the exemplary embodiment, the apparatus is equipped with a conveyance distance detecting unit to detect the conveyance distance of the fixing jig 20 from a reference point of the chain conveyor 12.

The conveyance distance detecting unit is composed of, for example, an encoder 18 installed in the motor 16 for detecting the cumulative number of revolutions of the motor 16. By measuring the cumulative number of revolutions of the motor 16 with the encoder 18, for example, the amount of movement (conveyance distance) of each fixing jig 20 from the motor position can be detected using the motor position as the reference point.

In some embodiments, as shown in FIGS. 2, 8, and 10, an incision making part 22 is provided above the chain conveyor 12.

The incision making part 22 includes a scraper part 24 vertically movable above the chain conveyor 12, a drive device for vertically moving the scraper part 24, an incision blade 60 attached to the scraper part 24, and a posture adjustment device 40.

The drive device is composed of, for example, a servo motor 26 supported by a support 28, as shown in FIG. 2. The servo motor 26 rotates a screw shaft 26a that passes vertically through the support 28. The screw shaft 26a is provided with a movable block 30 that is slidable on the screw shaft 26a by rotation of the screw shaft 26a. A bracket 32 is rotatably attached to the movable block 30 at one end via a shaft 32a, and the scraper part 24 hangs from the other end.

In the exemplary configuration, the incision making part 22 includes an elastic support part which elastically supports the scraper part 24 and the incision blade 60 attached to the scraper part 24 so that they can retract downstream in the conveying direction of the workpiece w.

The elastic support part is composed of an air cylinder 34 fixed to the support 28. A piston rod 34a of the air cylinder 34 passes downward through the support 28 and is coupled to the end of the bracket 32 on the side where the scraper part 24 is fixed. This allows the scraper part 24 to escape downstream in the conveying direction (direction of arrow b) when a reaction force above a certain level is applied to the scraper part 24 from the workpiece w.

Further, the incision making part 22 is configured to move the scraper part 24 along the scapula bone surface of the workpiece w by operating the servo motor 26 to lower the scraper part 24 and the incision blade 60 attached to the scraper part 24 in accordance with the timing when the workpiece w fixed to the fixing jig 20 comes to the meat separation position below the scraper part 24. In the exemplary embodiment, the apparatus is equipped with a synchronizing device (not shown) that enables this operation of the scraper part 24 based on a detection value detected by the encoder 18.

With this configuration, the scraper part 24 separates a meat part around the scapula bones of the workpiece w that has come to the meat separation position from the scapula bones, and the incision blade 60 incises a skin between the scapula bones. The scraper part 24 and the incision blade 60 will be described later in detail.

In the exemplary embodiment, the scraper part 24 is composed of a pair of scraper members 24a and 24b disposed along the conveyance path of the fixing jig 20 formed by the chain conveyor 12 on opposite sides of the center line C (see FIG. 3) passing through the center of the fixing jig 20. The scraper members 24a and 24b are formed, for example, in a long plate shape, and are arranged in such a way that the distance between them gradually decreases toward the downstream side in the conveying direction of the workpiece w (direction of arrow a).

When the scraper members 24a and 24b of such a shape descend, they contact the surface of scapula bones of the workpiece w and can separate the meat part attached to the surface of scapula bones from the scapula bones with good yield.

In the illustrated embodiment, as shown in FIG. 2, a reinforcement bar 48 is attached adjacent to the pair of scraper members 24a and 24b.

Figure 4A:
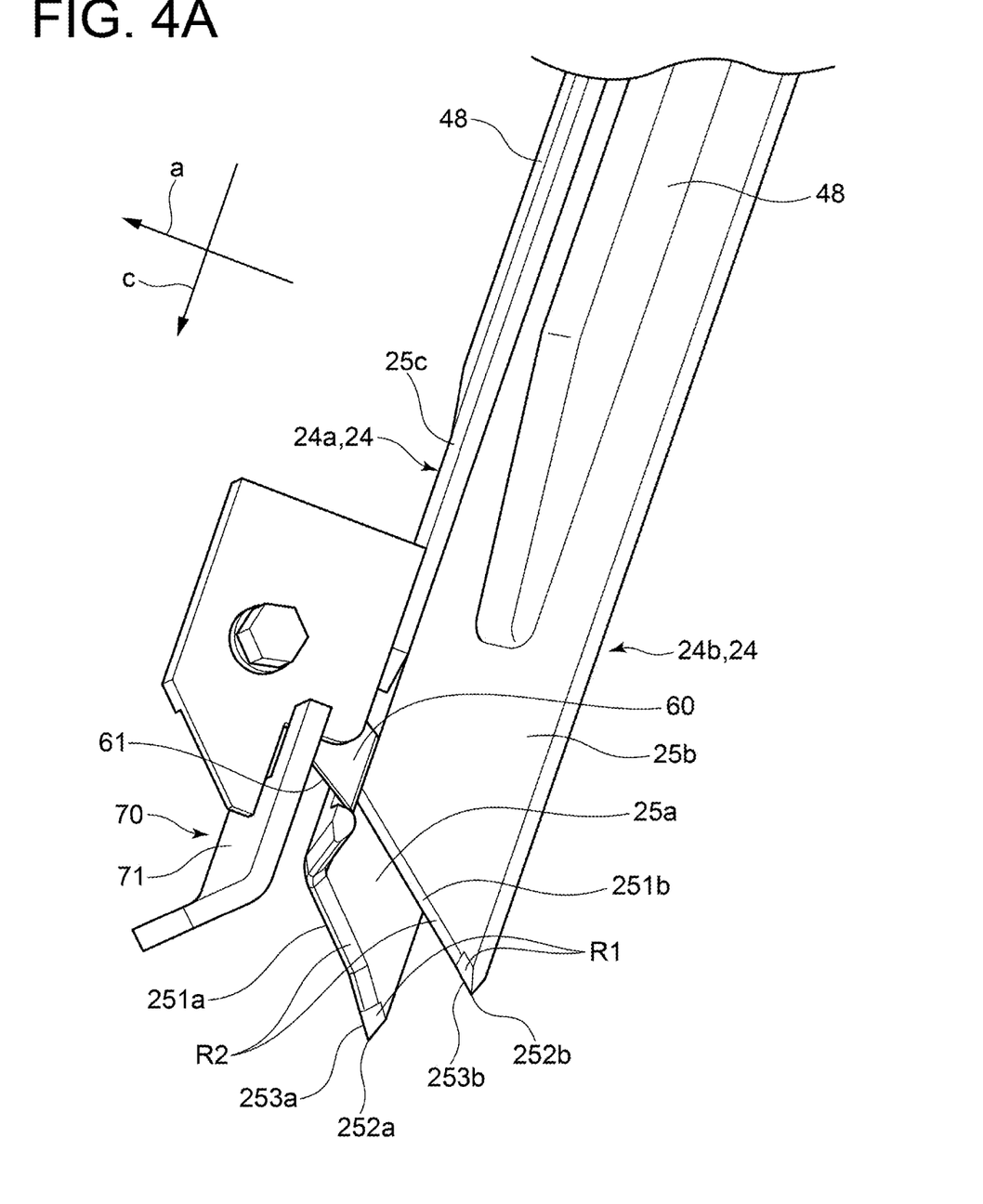
FIG. 4A is a perspective view of a pair of scraper members.

FIG. 4A is a perspective view of the pair of scraper members 24a and 24b.

Figure 4B:
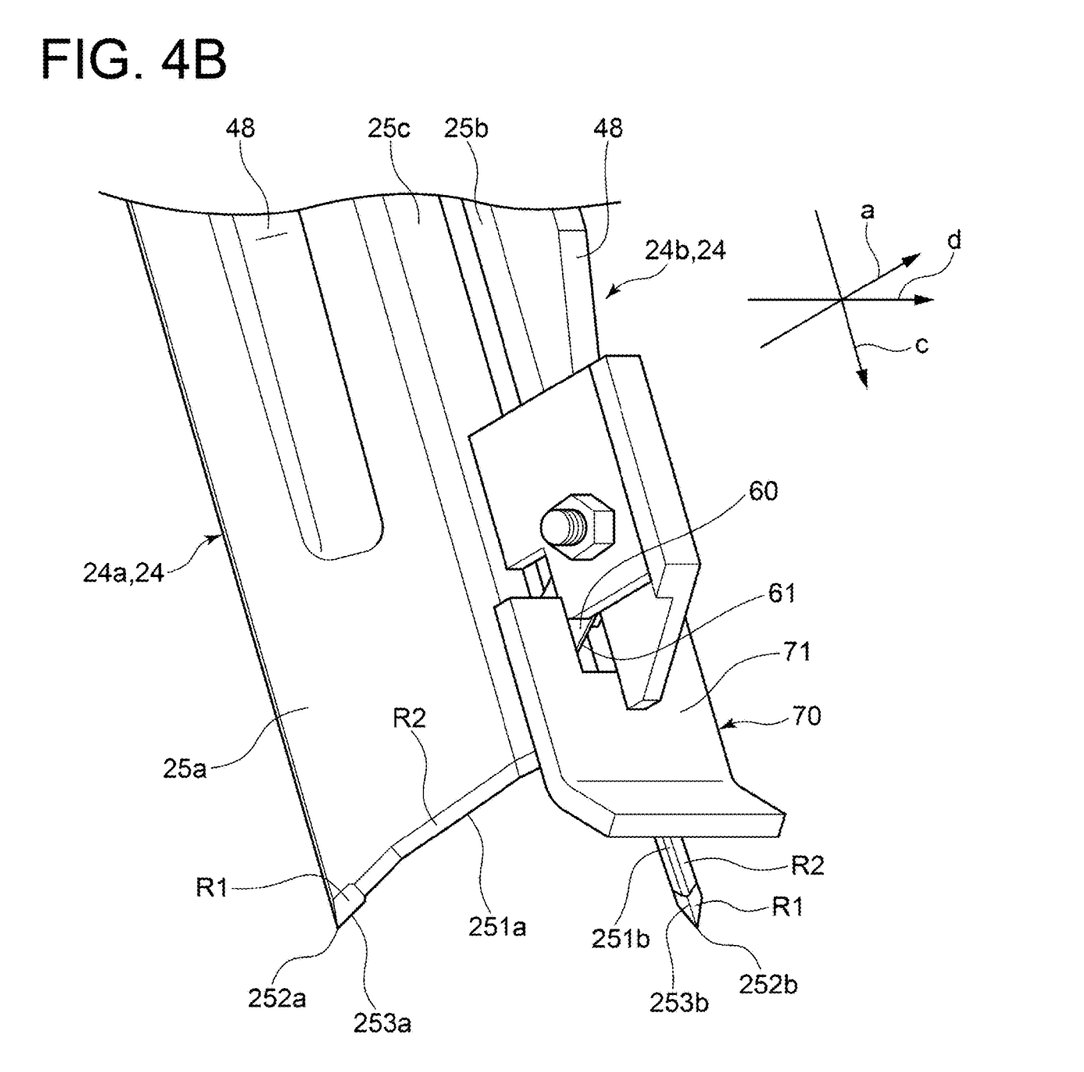
FIG. 4B is a perspective view of the pair of scraper members when viewed from a different direction than FIG. 4A.

FIG. 4B is a perspective view of the pair of scraper members 24a and 24b when viewed from a different direction than FIG. 4A.

In the illustrated embodiment, one scraper member 24a of the pair of scraper members 24a and 24b has a scraper member body portion 25a formed in a flat long plate shape, and a back plate portion 25c extending from the end of the scraper member body portion 25a on the downstream side in the conveying direction of the workpiece w (direction of arrow a) toward the other scraper member 24b of the pair of scraper members 24a and 24b.

The other scraper member 24b of the pair of scraper members 24a and 24b has a scraper member body portion 25b formed in a flat long plate shape.

As well shown in FIGS. 4A and 4B, the lower end surfaces 251a and 251b of the pair of scraper member body portions 25a and 25b are formed so as to extend downstream in the conveying direction of the workpiece w (direction of arrow a) as they extend upward.

The lower end surfaces 251a and 251b of the pair of scraper member body portions 25a and 25b are located on the downstream side in the traveling direction (direction of arrow c) in which the scraper part 24 travels toward the fixing jig 20 when the meat part is separated from the scapula bones.

As described below, when the pair of scraper member body portions 25a and 25b penetrates the workpiece w, the lower end surfaces 251a and 251b of the pair of scraper member body portions 25a and 25b enter the workpiece w from the end portions 252a and 252b on the upstream side in the conveying direction of the workpiece w (direction of arrow a). Therefore, if the end surfaces 251a and 251b are formed so as to extend downstream in the conveying direction of the workpiece w (direction of arrow a) as they extend upward, the pair of scraper member body portions 25a and 25b can easily penetrate the workpiece w. This makes it easier for the pair of scraper members to reach the surface of scapula bones in separating the meat part from the scapula bones, thus improving the yield of the separated meat part.

As well shown in FIGS. 4A and 4B, the pair of scraper member body portions 25a and 25b has cutting edges 253a and 253b formed only in a partial region R1 of the lower end surfaces 251a and 251b, including end portions 252a and 252b on the upstream side in the conveying direction of the workpiece w (direction of arrow a).

As described above, when the pair of scraper member body portions 25a and 25b penetrates the workpiece w, the lower end surfaces 251a and 251b enter the workpiece w from the end portions 252a and 252b on the upstream side in the conveying direction of the workpiece w (direction of arrow a). Accordingly, the cutting edges 253a and 253b formed at the end portions 252a and 252b can cut the meat part, so that the pair of scraper member body portions 25a and 25b can easily penetrate the workpiece w. This makes it easier for the pair of scraper member body portions 25a and 25b to reach the surface of scapula bones in separating the meat part from the scapula bones, thus improving the yield of the separated meat part.

In addition, since the cutting edges 253a and 253b are not formed in a region R2 other than the partial region R1 on the lower end surfaces 251a and 251b, the risk of scraping off the scapula bones by the region R2 is reduced. This reduces the risk of the scapula bones being scraped off and adhering to the meat part as foreign substances.

Attached to the back plate portion 25c is an incision blade 60 for incising a skin between the scapula bones and a meat guide part 70.

Figure 5:
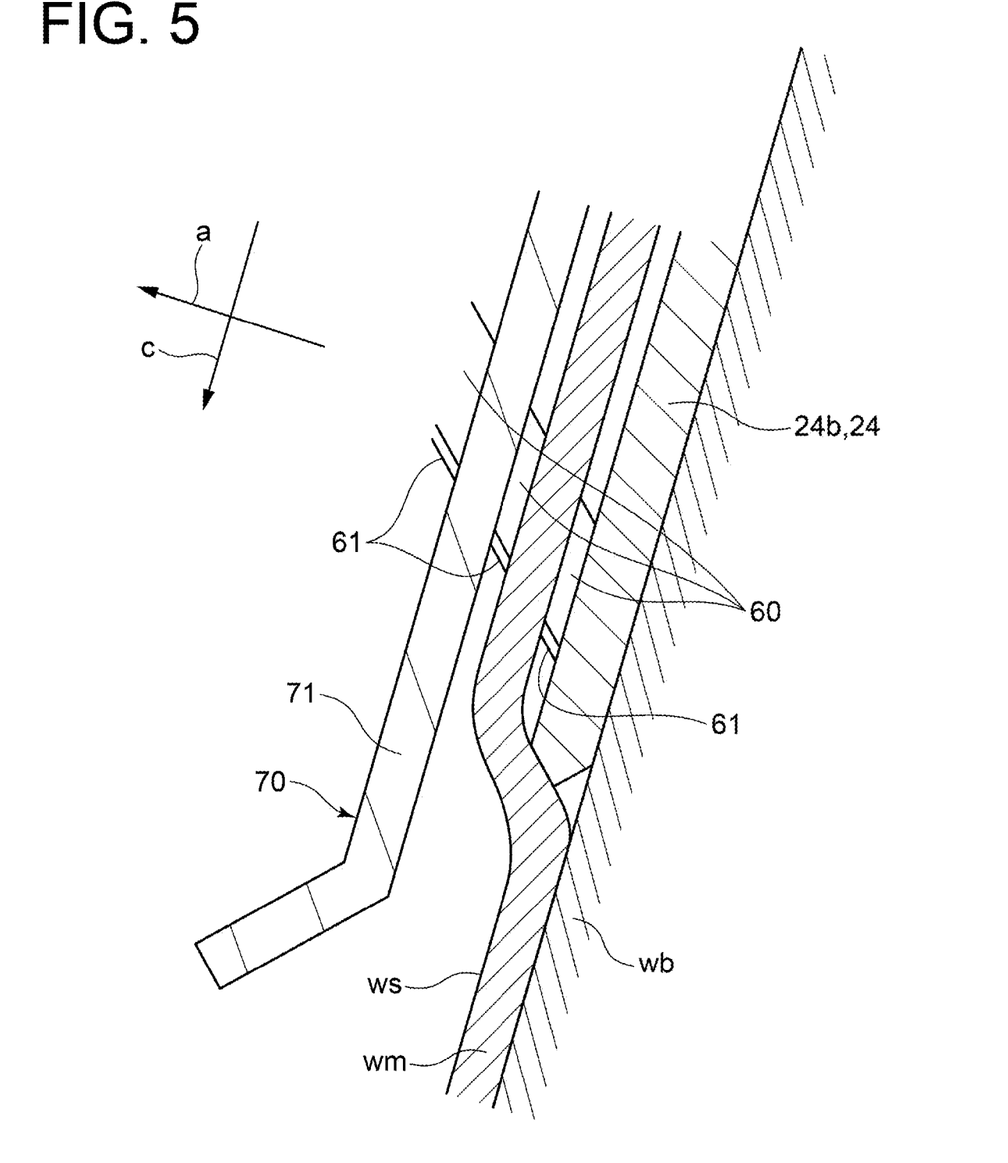
FIG. 5 is a schematic cross-sectional view showing the separation of a meat part around scapula bones from the scapula bones and the incision of a skin between the scapula bones with the incision making part.

FIG. 5 is a schematic cross-sectional view showing the separation of a meat part wm around scapula bones wb from the scapula bones wb and the incision of a skin ws between the scapula bones wb with the incision making part 22.

In the illustrated embodiment, the incision blade 60 has a cutting edge 61 extending in a direction away from the fixing jig 20, i.e., downstream in the conveying direction of the workpiece w (direction of arrow a) as it extends upward, i.e., upstream in a traveling direction (direction of arrow c) in which the scraper part 24 travels toward the fixing jig 20 in separating the meat part wm from the scapula bones wb.

In the illustrated embodiment, the meat guide part 70 is disposed on the opposite side of the scraper part 24 from the incision blade 60 and has a plate-like member 71 arranged to overlap the scraper part 24 when viewed from downstream in the conveying direction of the workpiece w (direction of arrow a). The member 71 is arranged so that at least a part of the member 71 is located upstream of the incision blade 60 in the traveling direction (direction of arrow c) when viewed from downstream in the conveying direction of the workpiece w (direction of arrow a). As well shown in FIG. 4B, the member 71 is arranged so that at least a part of the member 71 is located on one and the other sides of the incision blade 60 in the thickness direction of the incision blade 60 (direction of arrow d).

By lowering the scraper part 24 and the incision blade 60 attached to the scraper part 24 and moving the scraper part 24 along the surface of the scapula bones wb of the workpiece w, the pair of scraper member body portions 25a and 25b separates the meat part wm with skin from the scapula bones wb, as shown in FIG. 5.

The meat part wm with skin separated from the scapula bones wb rides up on the pair of scraper member body portions 25a and 25b, is guided between the pair of scraper member body portions 25a and 25b and the meat guide part 70, and is cut by the incision blade 60.

The meat part wm separated from the scapula bones wb rides up on the pair of scraper member body portions 25a and 25b, is guided between the pair of scraper member body portions 25a and 25b and the meat guide part 70, and is cut by the incision blade 60.

With the above-described poultry processing apparatus 10, the skin ws between the scapula bones wb of the meat part wm that rides up on the scraper part 24 can be cut from the inside of the workpiece w by the incision blade 60. This makes it more difficult to damage the meat of the neck part wn of the workpiece w, improving the yield and quality of the meat of the neck part wn of the workpiece w.

Additionally, with the above-described poultry processing apparatus 10, the process of separating the meat part wm around the scapula bones wb from the scapula bones wb and the process of incising the skin ws between the scapula bones wb, which were conventionally performed in two processes, can be performed in a single process, thus improving the processing efficiency of the workpiece w.

In the above-described poultry processing apparatus 10, the incision blade 60 is fixed to the scraper part 24.

As a result, the skin ws between the scapula bones wb of the meat part wm that rides up on the scraper part 24 can be cut easily.

In the above-described poultry processing apparatus 10, the scraper part 24 includes a pair of scraper members 24a and 24b spaced apart from each other in a direction intersecting the traveling direction (direction of arrow c). The incision blade 60 is fixed to one of the pair of scraper members 24a and 24b (in the illustrated embodiment, scraper member 24a).

This allows the pair of scraper members 24a and 24b to be aligned with the position and orientation of the scapula bones wb of the workpiece w, so that the pair of scraper members 24a and 24b can be made to follow the surface of the scapula bones wb reliably when the meat part wm is separated from the scapula bones wb. Thus, it is possible to improve the yield of the separated meat part wm.

In the above-described poultry processing apparatus 10, the meat part wm with the skin ws can be guided to the incision blade 60 by the meat guide part 70 when the meat part wm is separated from the scapula bones wb, improving the certainty of incision of the skin ws between the scapula bones wb by the incision blade 60.

(Posture Adjustment Device 40)

Figure 6:
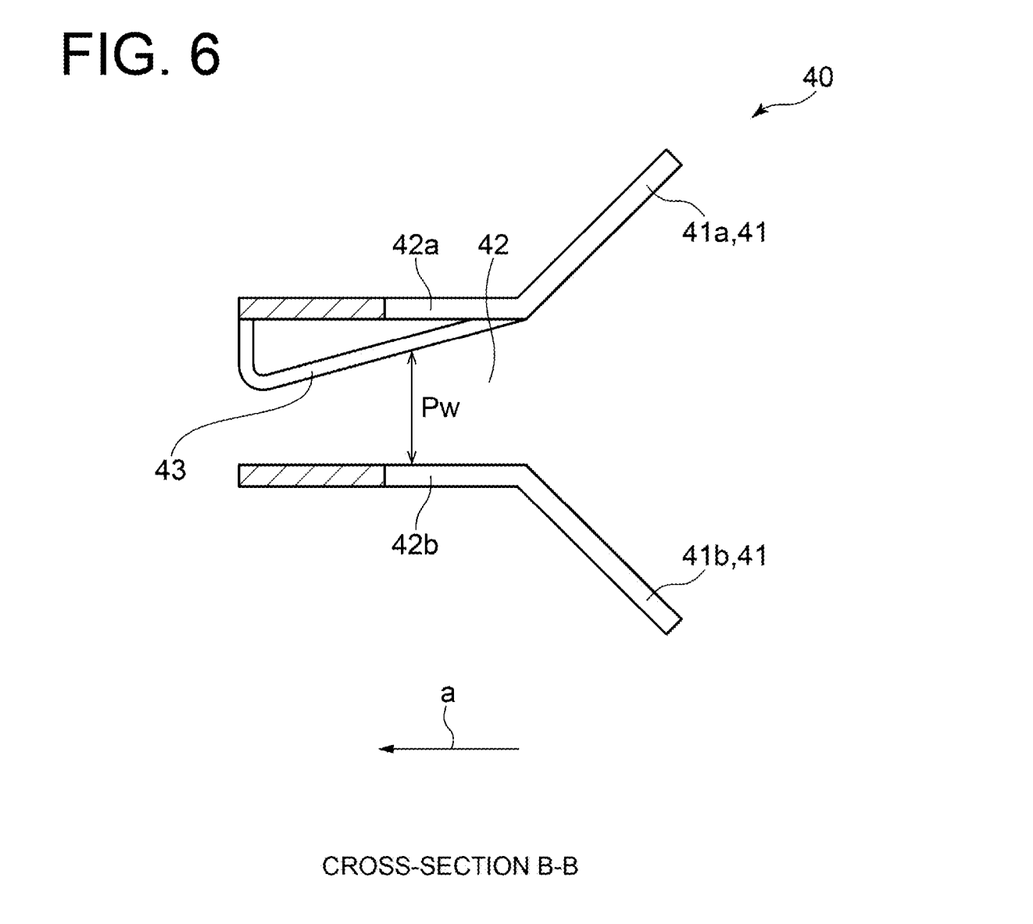
FIG. 6 is a cross-sectional view taken along line B-B in FIG. 2.

FIG. 6 is a cross-sectional view taken along line B-B in FIG. 2.

In the illustrated embodiment, the poultry processing apparatus 10 is equipped with a posture adjustment device 40 disposed upstream of the scraper part 24 in the conveying direction of the workpiece w (direction of arrow a) and configured to raise the neck part wn of the workpiece w. The posture adjustment device 40 includes a guide member 41 disposed above a track along which the fixing jig 20 moves and configured to guide the neck part wn of the workpiece w, and a tapered passage 42 disposed above the track and downstream of the guide member 41 in the conveying direction (direction of arrow a) and having a passage width Pw gradually decreasing toward the downstream side in the conveying direction.

That is, the posture adjustment device 40 for a poultry carcass includes a fixing jig 20, which is a holder for holding the poultry carcass (workpiece w) from the inside while being inserted inside the poultry carcass (workpiece w), a guide member 41 disposed above a track along which the fixing jig 20 moves and configured to guide the neck part wn of the poultry carcass (workpiece w), and a tapered passage 42 disposed above the track and downstream of the guide member 41 in the moving direction of the fixing jig 20 and having a passage width Pw gradually decreasing toward the downstream side in the moving direction.

In the illustrated embodiment, the guide member 41 has a pair of first plate members 41a and 41b spaced apart from each other in a direction perpendicular to the conveying direction of the workpiece w (direction of arrow a). The pair of first plate members 41a and 41b is arranged so that the distance between the first plate members 41a and 41b decreases from upstream to downstream in the conveying direction of the workpiece w.

A pair of second plate portions 42a and 42b is connected to the downstream side of the pair of first plate members 41a and 41b in the conveying direction, respectively, to form the tapered passage 42.

In the illustrated embodiment, each of the second plate portions 42a and 42b extends parallel to the conveying direction (direction of arrow a) downstream in the conveying direction. In the illustrated embodiment, a protruding plate portion 43 is attached to one second plate portion 42a of the pair of second plate portions 42a and 42b. The protruding plate portion 43 is formed so that the distance between the protruding plate portion 43 and the other second plate portion 42b of the pair of second plate portions 42a and 42b decreases from upstream to downstream in the conveying direction. Thus, the tapered passage 42 is formed by the protruding plate portion 43 and the other second plate portion 42b so that the passage width Pw decreases toward the downstream side in the conveying direction.

The protruding plate portion 43 and the other second plate portion 42b are a pair of wall portions that constitute the tapered passage 42.

In the illustrated embodiment, the relative position between the protruding plate portion 43 and the other second plate portion 42b is invariable.

In the illustrated embodiment, one of the pair of wall portions and the other, the protruding plate portion 43 and the other second plate portion 42b, are asymmetrically formed with respect to a center line C through which the center position of the fixing jig 20 passes when viewed from above, i.e., the center line C passing through the center of the fixing jig 20. The protruding plate portion 43, one of the pair of wall portions, is formed so as to gradually approach the other second plate portion 42b, the other of the pair of wall portions, toward the downstream side in the moving direction.

FIGS. 7A, 7B, 7C, and 7D are diagrams for describing the operation of the posture adjustment device 40 to raise the neck part wn that has fallen down to the downstream side in the moving direction.

The workpiece w mounted on the fixing jig 20 has its back side facing downstream in the moving direction so that the neck part wn falls down to the downstream side in the moving direction. Therefore, the fallen neck part wn may interfere with the separation of the meat part wm around the scapula bones wb and the incision of the skin ws between the scapula bones wb, as described above.

For this reason, in the poultry processing apparatus 10 according to some embodiments, the posture adjustment device 40 is intended to raise the neck part wn just before the separation of the meat part wm around the scapula bones wb and the incision of the skin ws between the scapula bones wb.

Figure 7A:
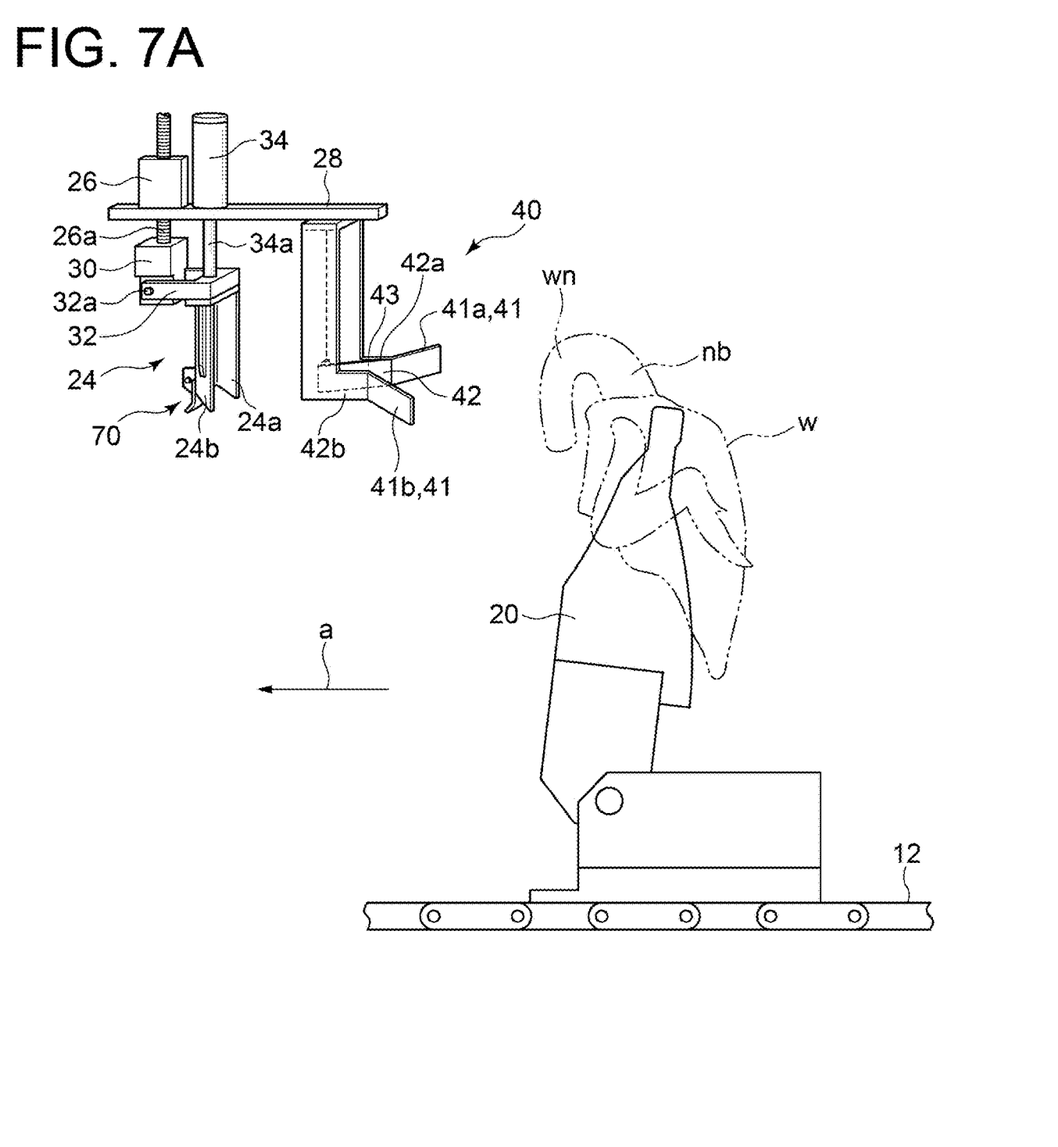
FIG. 7A is a diagram for describing the operation of a posture adjustment device to raise a neck transition part.
Figure 7B:
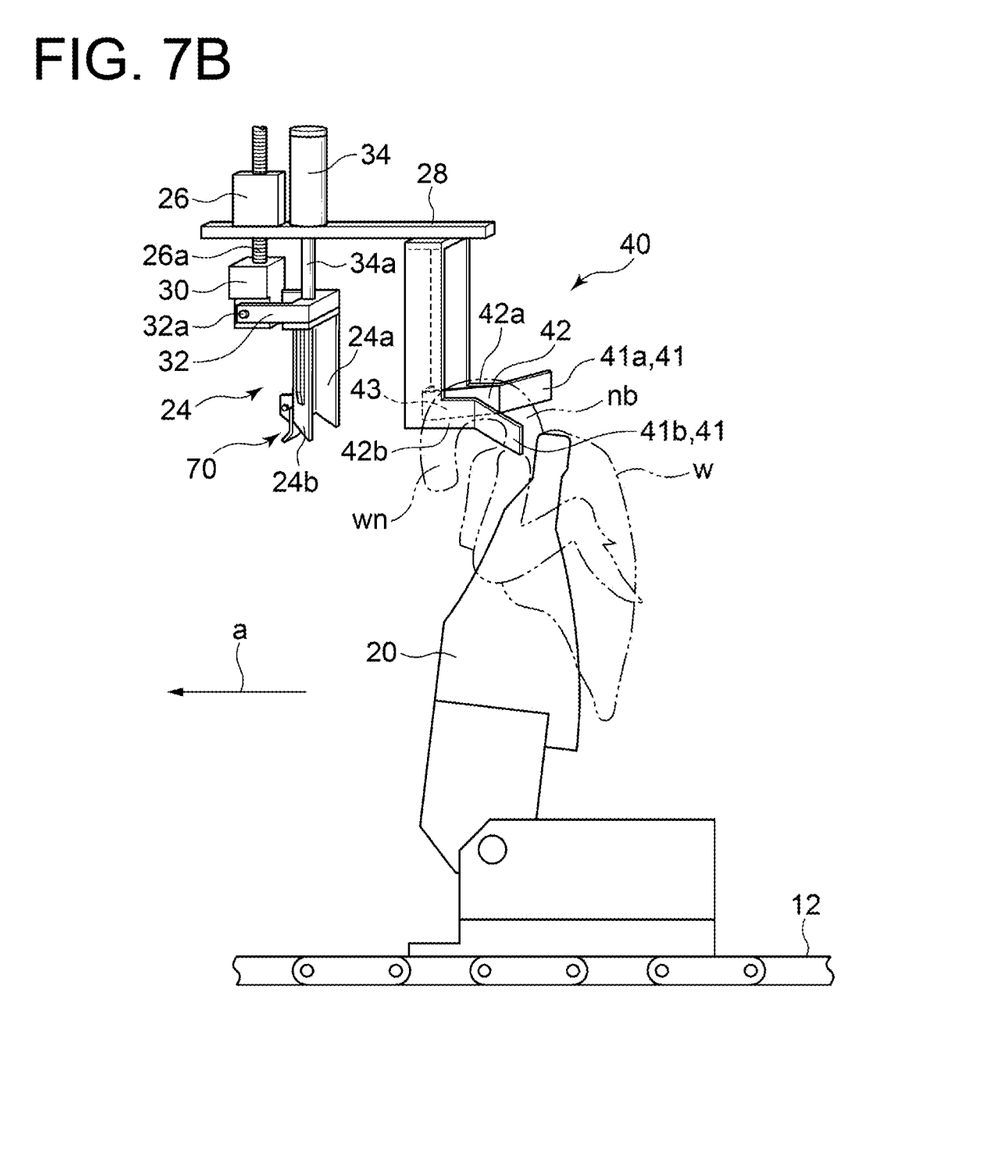
FIG. 7B is a diagram for describing the operation of a posture adjustment device to raise a neck transition part.

The workpiece w mounted on the fixing jig 20 moves downstream in the moving direction as shown in FIG. 7A, and when it reaches the posture adjustment device 40 as shown in FIG. 7B, the root portion nb of the neck part wn is guided by the guide member 41 to the tapered passage 42.

In the illustrated embodiment, when the neck part wn passes through the tapered passage 42, since the passage width Pw becomes narrower toward the downstream side in the moving direction so that the neck part wn gradually becomes difficult to pass through the tapered passage 42, the neck part wn that has fallen toward the downstream side in the moving direction can be raised toward the upstream side in the moving direction.

Figure 7C:
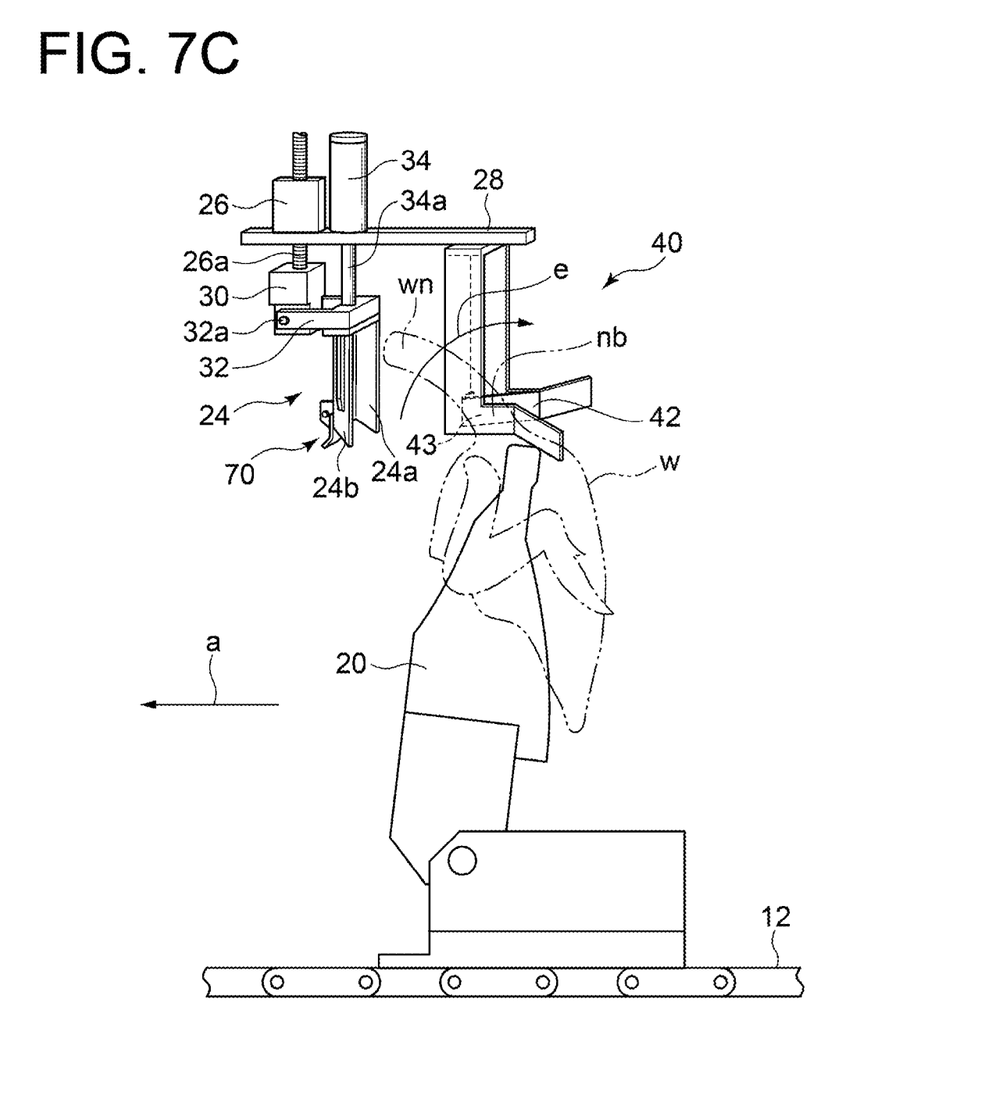
FIG. 7C is a diagram for describing the operation of a posture adjustment device to raise a neck transition part.
Figure 7D:
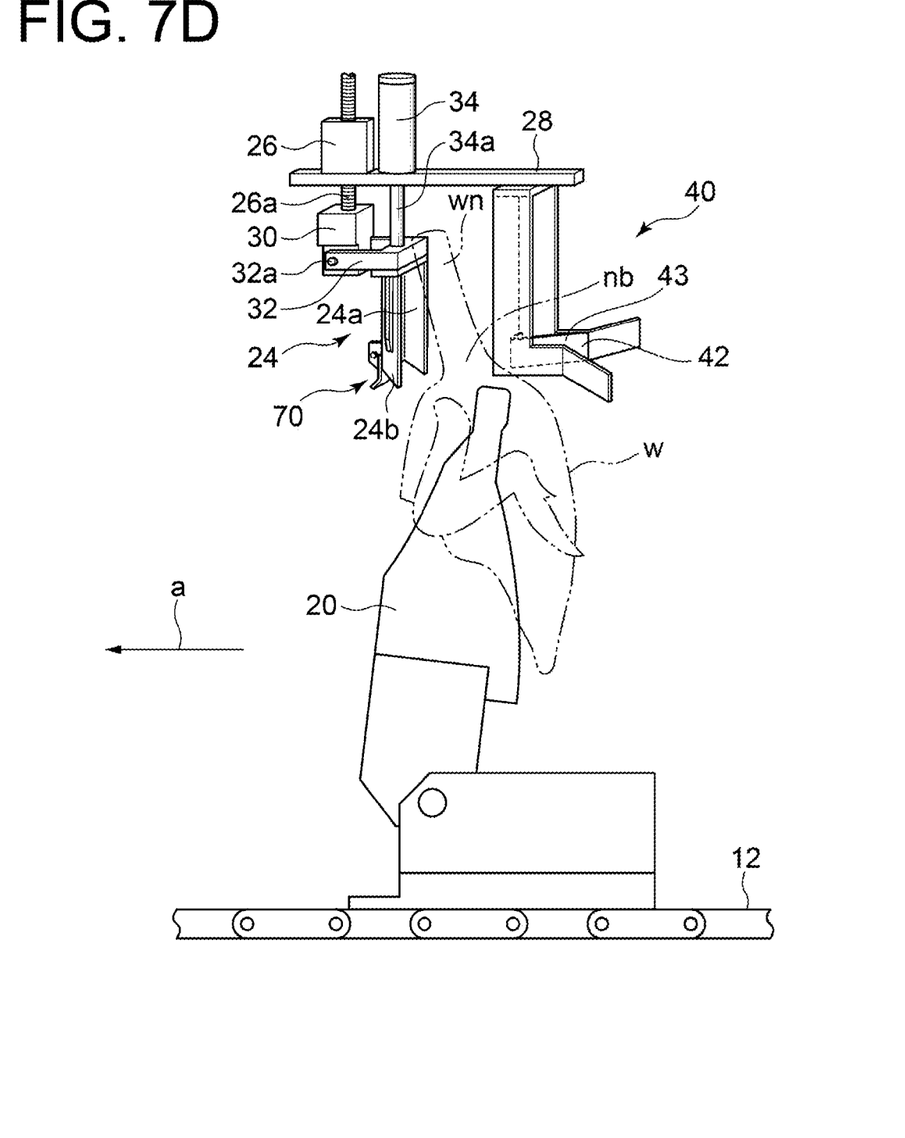
FIG. 7D is a diagram for describing the operation of a posture adjustment device to raise a neck transition part.

More specifically, as shown in FIG. 7C, when the root portion nb of the neck part wn is caught in the tapered passage 42, the portion of the workpiece w below the root portion nb moves downstream of the root portion nb in the moving direction, causing the neck part wn to rotate clockwise (direction of arrow e) around the root portion nb. As a result, the neck part wn on the tip side than the root portion nb rotates clockwise and rises as shown in FIG. 7D.

After the root portion nb passes through the tapered passage 42, the neck part wn tries to fall down again toward the downstream side in the moving direction. However, the neck part wn is prevented from falling down by the scraper part 24 or the bracket 32, which are located downstream of the posture adjustment device 40 in the moving direction, as they come into contact with the neck part wn.

In the above-described poultry processing apparatus 10, by raising the neck part wn of the workpiece w by the posture adjustment device 40 just before separating the meat part wm from the scapula bones wb, the neck part wn is not in the way when the meat part wm is separated from the scapula bones wb, improving the certainty of separation of the meat part wm from the scapula bones wb.

In the above-described poultry processing apparatus 10, the posture adjustment device 40 may move upstream in the moving direction relative to the fixing jig 20 to raise the neck part wn. Specifically, in the above-described poultry processing apparatus 10, the posture adjustment device 40 may be immobile while the fixing jig 20 may move downstream in the moving direction, or the posture adjustment device 40 itself may move upstream in the moving direction. In the above-described poultry processing apparatus 10, the neck part wn can be raised by relative movement of the posture adjustment device 40 and the fixing jig 20 in the moving direction.

Thus, the neck part wn can be easily raised by the posture adjustment device 40 with a simple configuration.

In the above-described posture adjustment device 40, since the relative position between the protruding plate portion 43 and the other second plate portion 42b is invariable, it is not necessary to move the protruding plate portion 43 and the other second plate portion 42b relative to each other, and the configuration of the posture adjustment device 40 can be simplified.

Additionally, in the above-described posture adjustment device 40, since the relative position between the tapered passage 42 and the guide member 41 is invariable, it is not necessary to move the tapered passage 42 and the guide member 41 relative to each other, and the configuration of the posture adjustment device 40 can be simplified.

In the above-described posture adjustment device 40, as previously described, since the protruding plate portion 43 and the other second plate portion 42b are asymmetrically formed with respect to the center line C passing through the center of the fixing jig 20, even with the same passage width Pw, the resistance of the neck part wn to pass through the tapered passage 42 is greater than when they are symmetrically formed.

The neck part wn can be raised more reliably by increasing the resistance of the neck part wn as it passes through the tapered passage 42. However, if the passage width Pw of the tapered passage 42 is narrowed to increase the resistance of the neck part wn as it passes through the tapered passage 42, since the thickness of the neck part wn varies for each poultry carcass, the resistance may be excessively high for some poultry carcasses, unnecessarily increasing the burden on the poultry carcass. Therefore, if the protruding plate portion 43 and the other second plate portion 42b are asymmetrically formed with respect to the center line C when viewed from above, the resistance of the neck part wn to pass through the tapered passage 42 can be increased while maintaining some passage width Pw. Thus, the burden on the poultry carcass when the neck part wn passes through the tapered passage 42 can be suppressed.

The present disclosure is not limited to the embodiments described above, but includes modifications to the embodiments described above, and embodiments composed of combinations of those embodiments.

For example, in the above-described embodiments, the posture adjustment device 40 is used to raise the neck part wn just before separating the meat part wm around the scapula bones wb and incising the skin ws between the scapula bones wb. However, the use of the posture adjustment device 40 is not limited to the use described above and may be used for other processes in the poultry processing.

The contents described in the above embodiments would be understood as follows, for instance.

(1) A poultry processing apparatus 10 according to at least one embodiment of the present disclosure includes: a scraper part 24 for separating a meat part wm around scapula bones wb of a poultry carcass (workpiece w) held by a holder (fixing jig 20) from the scapula bones wb; a cutting edge extending in a direction away from the holder (fixing jig 20) as the cutting edge extends upstream in a traveling direction in which the scraper part 24 travels toward the holder (fixing jig 20) in separating the meat part wm from the scapula bones wb; and an incision blade 60 with the cutting edge 61 for incising a skin ws between the scapula bones wb of the meat part wm that rides up on the scraper part 24.

With the above configuration (1), the skin ws between the scapula bones wb of the meat part wm that rides up on the scraper part 24 can be cut from the inside of the poultry carcass (workpiece w) by the incision blade 60. This makes it more difficult to damage the meat of the neck part wn of the poultry carcass (workpiece w), improving the yield and quality of the meat of the neck part wn of the poultry carcass (workpiece w).

Additionally, with the above configuration (1), the process of separating the meat part wm around the scapula bones wb from the scapula bones wb and the process of incising the skin ws between the scapula bones wb, which were conventionally performed in two processes, can be performed in a single process, thus improving the processing efficiency of the poultry carcass.

(2) In some embodiments, in the above configuration (1), the incision blade 60 may be fixed to the scraper part 24.

With the above configuration (2), the skin ws between the scapula bones wb of the meat part wm that rides up on the scraper part 24 can be cut easily.

(3) In some embodiments, in the above configuration (1) or (2), the scraper part 24 may include a pair of scraper members 24a and 24b spaced apart from each other in a direction intersecting the traveling direction. The incision blade 60 may be fixed to one of the pair of scraper members 24a and 24b.

With the above configuration (3), the pair of scraper members 24a and 24b can be aligned with the position and orientation of the scapula bones wb of the poultry carcass (workpiece w), so that the pair of scraper members 24a and 24b can be made to follow the surface of the scapula bones wb reliably when the meat part wm is separated from the scapula bones wb. Thus, it is possible to improve the yield of the separated meat part wm.

Additionally with the above configuration (3), the incision blade 60 can be easily fixed to one of the pair of scraper members 24a and 24b.

(4) In some embodiments, in the above configuration (3), end surfaces 251a and 251b of the pair of scraper members 24a and 24b on a downstream side in the traveling direction may extend downstream in a moving direction of the holder (fixing jig 20) as the end surfaces extend upstream in the traveling direction.

With the above configuration (4), when the pair of scraper members 24a and 24b penetrates the poultry carcass (workpiece w), the end surfaces (end surfaces 251a and 251b) of the pair of scraper members 24a and 24b on the downstream side in the traveling direction enter the poultry carcass from the end portions 252a and 252b on the upstream side in the moving direction of the holder (fixing jig 20), so that the pair of scraper members 24a and 24b can easily penetrate the poultry carcass (workpiece w). This makes it easier for the pair of scraper members 24a and 24b to reach the surface of scapula bones wb in separating the meat part wm from the scapula bones wb, thus improving the yield of the separated meat part wm.

(5) In some embodiments, in the above configuration (4), the pair of scraper members 24a and 24b may have cutting edges 253a and 253b formed only in a partial region R1 of the end surfaces (end surfaces 251a and 251b) of the scraper members 24a and 24b on the downstream side in the traveling direction, the partial region R1 including end portions 252a and 252b on the upstream side in the moving direction of the holder (fixing jig 20).

With the above configuration (5), the pair of scraper members 24a and 24b can easily reach the surface of scapula bones wb in separating the meat part wm from the scapula bones wb, thus improving the yield of the separated meat part wm.

Additionally, with the above configuration (5), since the cutting edges 253a and 253b are not formed in a region R2 other than the partial region R1 on the end surfaces 251a and 251b of the pair of scraper members 24a and 24b on the downstream side in the traveling direction, the risk of scraping off the scapula bones wb by the region R2 is reduced. This reduces the risk of the scapula bones wb being scraped off and adhering to the meat part wm as foreign substances.

(6) In some embodiments, in any one of the above configurations (1) to (5), the apparatus may include a meat guide part 70 disposed on an opposite side of the scraper part 24 from the incision blade 60.

With the above configuration (6), the meat part wm with skin ws can be guided to the incision blade 60 by the meat guide part 70 when the meat part wm is separated from the scapula bones wb, improving the certainty of incision of the skin ws between the scapula bones wb by the incision blade 60.

(7) In some embodiments, in any one of the above configurations (1) to (6), the apparatus may include a posture adjustment device 40 disposed upstream of the scraper part 24 in a moving direction of the holder (fixing jig 20) and configured to raise a neck wn part of the poultry carcass (workpiece w). The posture adjustment device 40 may include: a guide member 41 disposed above a track along which the holder (fixing jig 20) moves and configured to guide the neck part wn of the poultry carcass (workpiece w); and a tapered passage 42 disposed above the track and downstream of the guide member 41 in the moving direction of the holder (fixing jig 20) and having a width Pw gradually decreasing toward a downstream side in the moving direction.

With the above configuration (7), when the neck part wn passes through the tapered passage 42, since the passage width Pw becomes narrower toward the downstream side in the moving direction so that the neck part wn gradually becomes difficult to pass through the tapered passage 42, the neck part wn that has fallen toward the downstream side in the moving direction can be raised toward the upstream side in the moving direction. By raising the neck part wn of the poultry carcass (workpiece w) by the posture adjustment device 40 just before separating the meat part wm from the scapula bones wb, the neck part wn is not in the way when the meat part wm is separated from the scapula bones wb, improving the certainty of separation of the meat part wm from the scapula bones wb.

(8) In some embodiments, in the above configuration (7), the posture adjustment device 40 may be configured to move upstream in the moving direction relative to the holder (fixing jig 20) to raise the neck part wn.

With the above configuration (8), the neck part wn can be raised easily.

(9) In some embodiments, in the above configuration (7) or (8), the tapered passage 42 may be composed of a pair of wall portions (protruding plate portion 43 and other second plate portion 42b) spaced apart from each other in a direction intersecting the moving direction. Further, a relative position between one (protruding plate portion 43) of the pair of wall portions (protruding plate portion 43 and other second plate portion 42b) and the other (other second plate portion 42b) may be invariable.

With the above configuration (9), since it is not necessary to move one (protruding plate portion 43) of the pair of wall portions (protruding plate portion 43 and other second plate portion 42b) and the other (other second plate portion 42b) relative to each other, the configuration of the posture adjustment device 40 can be simplified.

(10) In some embodiments, in the above configuration (9), one (protruding plate portion 43) of the pair of wall portions (protruding plate portion 43 and other second plate portion 42b) and the other (other second plate portion 42b) may be asymmetrically formed with respect to a center line (center line C) through which a center position of the holder (fixing jig 20) passes when viewed from above, and one (protruding plate portion 43) of the pair of wall portions may be formed so as to gradually approach the other (other second plate portion 42b) of the pair of wall portions toward a downstream side in the moving direction of the holder (fixing jig 20).

With the above configuration (10), the resistance of the neck part wn to pass through the tapered passage 42 can be increased while maintaining some passage width Pw. Thus, the burden on the poultry carcass (workpiece w) when the neck part wn passes through the tapered passage 42 can be suppressed.

(11) In some embodiments, in any one of the above configurations (7) to (10), a relative position between the tapered passage 42 and the guide member 41 may be invariable.

With the above configuration (11), it is not necessary to move the tapered passage 42 and the guide member 41 relative to each other, and the configuration of the posture adjustment device 40 can be simplified.

REFERENCE SIGNS LIST

10 Poultry processing apparatus
20 Fixing jig (Holder)
22 Incision making part
24 Scraper part
24a, 24b Scraper member
40 Posture adjustment device
41 Guide member
42 Tapered passage
60 Incision blade
70 Meat guide part

The invention claimed is:

1. A poultry processing apparatus, comprising:
a scraper part for separating a meat part around scapula bones of a poultry carcass held by a holder from the scapula bones;
a cutting edge extending in a direction away from the holder as the cutting edge extends upstream in a traveling direction in which the scraper part travels toward the holder in separating the meat part from the scapula bones, and
an incision blade with the cutting edge for incising a skin between the scapula bones of the meat part that rides up on the scraper part.

2. The poultry processing apparatus according to claim 1, wherein the incision blade is fixed to the scraper part.

3. The poultry processing apparatus according to claim 1, wherein the scraper part includes a pair of scraper members spaced apart from each other in a direction intersecting the traveling direction, and
wherein the incision blade is fixed to one of the pair of scraper members.

4. The poultry processing apparatus according to claim 3, wherein end surfaces of the pair of scraper members on a downstream side in the traveling direction extend downstream in a moving direction of the holder as the end surfaces extend upstream in the traveling direction.

5. The poultry processing apparatus according to claim 4, wherein the pair of scraper members has cutting edges formed only in a partial region of the end surfaces of the scraper members on the downstream side in the traveling direction, the partial region including upstream end portions of the end surfaces in the moving direction of the holder.

6. The poultry processing apparatus according to claim 1, comprising a meat guide part disposed on an opposite side of the scraper part from the incision blade.

7. The poultry processing apparatus according to claim 1, comprising a posture adjustment device disposed upstream of the scraper part in a moving direction of the holder and configured to raise a neck part of the poultry carcass,
wherein the posture adjustment device includes:
a guide member disposed above a track along which the holder moves and configured to guide the neck part of the poultry carcass; and
a tapered passage disposed above the track and downstream of the guide member in the moving direction of the holder and having a width gradually decreasing toward a downstream side in the moving direction.

8. The poultry processing apparatus according to claim 7,
wherein the posture adjustment device is configured to move upstream in the moving direction relative to the holder to raise the neck part.

9. The poultry processing apparatus according to claim 7,
wherein the tapered passage is composed of a pair of wall portions spaced apart from each other in a direction intersecting the moving direction, and
wherein a relative position between one of the pair of wall portions and the other is invariable.

10. The poultry processing apparatus according to claim 9,
wherein one of the pair of wall portions and the other are asymmetrically formed with respect to a center line through which a center position of the holder passes when viewed from above, and
wherein one of the pair of wall portions is formed so as to gradually approach the other of the pair of wall portions toward a downstream side in the moving direction of the holder.

11. The poultry processing apparatus according to claim 7,
wherein a relative position between the tapered passage and the guide member is invariable.

\* \* \* \* \*